US010560031B2

(12) United States Patent
Sagona

(10) Patent No.: US 10,560,031 B2
(45) Date of Patent: Feb. 11, 2020

(54) BI-DIRECTIONAL DC TO DC SIGNAL CONVERSION USING OBSERVER BASED ESTIMATED CURRENT SENSOR

(71) Applicant: Hamilton Sundstrand Corporation, Charlotte, NC (US)

(72) Inventor: John Duward Sagona, Poplar Grove, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 15/839,650

(22) Filed: Dec. 12, 2017

(65) Prior Publication Data

US 2019/0181767 A1 Jun. 13, 2019

(51) Int. Cl.
*H02M 1/08* (2006.01)
*H02M 3/335* (2006.01)
*H02M 1/00* (2006.01)

(52) U.S. Cl.
CPC ........ *H02M 3/33584* (2013.01); *H02M 1/08* (2013.01); *H02M 2001/0009* (2013.01)

(58) Field of Classification Search
CPC .............. H02M 3/337; H02M 3/3376; H02M 3/33592; H02M 1/08; H02M 3/335; H02M 3/33523; H02M 3/33584; H02M 2001/0009; H02M 2001/0012; Y02B 70/1433; Y02B 70/1475
USPC ......................................................... 363/17
See application file for complete search history.

(56) References Cited

U.S. PATENT DOCUMENTS

| | | | |
|---|---|---|---|
| 5,027,264 A | 6/1991 | DeDoncker et al. | |
| 6,356,461 B1 | 3/2002 | Jacobs | |
| 8,723,490 B2 | 5/2014 | Moussaoui et al. | |
| 8,811,039 B2 | 8/2014 | The Ngo et al. | |
| 9,130,470 B2 | 9/2015 | Rosado et al. | |
| 9,490,719 B2 | 11/2016 | Scandola | |
| 9,559,595 B2 | 1/2017 | Benchaib et al. | |
| 9,673,719 B2 | 6/2017 | Poshtkouhi et al. | |
| 2012/0014138 A1* | 1/2012 | Ngo ................ | H02M 3/33584 363/17 |
| 2015/0263603 A1 | 9/2015 | Pahlevaninezhad et al. | |
| 2016/0094149 A1 | 3/2016 | Pahlevaninezhad et al. | |
| 2016/0268917 A1 | 9/2016 | Ramsay et al. | |

OTHER PUBLICATIONS

Extended European Search Report for European Patent Application No. 18211905.7, dated May 7, 2019.

* cited by examiner

*Primary Examiner* — Nguyen Tran
*Assistant Examiner* — Monica Mata
(74) *Attorney, Agent, or Firm* — Locke Lord LLP; Daniel J. Fiorello; Scott D. Wofsy

(57) ABSTRACT

In accordance with at least one aspect of this disclosure, a bi-directional DC to DC converter includes a DC to DC conversion circuit, and a controller operatively connected to the conversion circuit to control a current output of the conversion circuit, wherein the controller includes an observer based estimated current sensor module which is configured to simulate a physical current sensor and to input an estimated output current feedback inner state signal $\hat{e}_o$ into a voltage output command feedback loop of the controller. The current sensor module can include an estimated sensor feedback loop.

13 Claims, 2 Drawing Sheets

BI-DIRECTIONAL DC TO DC SIGNAL CONVERSION USING OBSERVER BASED ESTIMATED CURRENT SENSOR

BACKGROUND

1. Field

The present disclosure relates to power conversion, more specifically to DC to DC power conversion, e.g., for Dual Active Bridges (DABs).

2. Description of Related Art

A Dual Active Bridge (e.g., for use in an aerospace or other applications) allows DC to DC conversion in both directions (e.g., 100V to 20V and from 20V to 100V, or any other voltage ratio). Existing systems require a hardware current sensor to decouple the load disturbances from, e.g., a 28V output (traditionally used for aircraft avionics) to provide a high quality of 28V power quality. However, DC current sensors are expensive. Also, the existing sensors and supporting circuits take up significant area on a printed wiring board assembly (PWBA).

Such conventional methods and systems have generally been considered satisfactory for their intended purpose. However, there is still a need in the art for improved power conversion systems. The present disclosure provides a solution for this need.

SUMMARY

In accordance with at least one aspect of this disclosure, a bi-directional DC to DC converter includes a DC to DC conversion circuit, and a controller operatively connected to the conversion circuit to control a current output state of the conversion circuit. The controller includes an observer based estimated current sensor module which is configured to simulate a physical current sensor and to input an estimated inner current feedback state signal $\hat{e}_o$ into the closed loop current ($I_{DCavg}$) command summing junction of the controller.

The current sensor module can include a closed loop on the estimated output voltage state $\hat{e}_o$ which is configured to allow the estimated state $\hat{e}_o$ to match measured state $e_o$ therefore accurately estimating the inner current state signal $\hat{e}_o$. The inner current states $\hat{e}_o$ can be accurately estimated and feed into the controller's closed loop current ($I_{DCavg}$) command summing junction to provide load disturbance rejection. The average DC link current state $I_{DCavg}$ is feed forward into the observer to eliminate delays and accurately track the load disturbances.

In certain embodiments, the controller can be configured to input a measured output voltage signal state $e_o$ from the controller at a beginning block of the estimated sensor feedback loop. For example, the beginning block of the estimated sensor feedback loop can include an error block configured to subtract a first estimated output state $\hat{e}_o$ of the estimated sensor feedback loop from the measured output voltage state signal $e_o$ to create an estimated error signal.

The controller can be configured to input an inner loop current signal $I_{DCavg}$ into an estimated sensor sum block of the estimated sensor feedback loop. The estimated sensor feedback loop can be configured to input the estimated error signal into parallel transfer functions, the output of which is input into the estimated sensor sum block and summed with the inner loop current signal $I_{DCavg}$.

An output of the estimate sensor sum block can be input into at least one transfer function to produce the estimated output current feedback inner state signal $\hat{e}_o$. In certain embodiments, the estimated output current feedback inner state signal $\hat{e}_o$ can be input into a sum block of the output command feedback loop of the controller. For example, an output of the sum block of the output command feedback loop can be an input inner loop current $*I_{DCavg}$ (e.g., from which the inner loop current signal $I_{DCavg}$ can be derived after processing through one or more transfer functions (e.g., the plant)).

In accordance with at least one aspect of this disclosure, a method can include simulating a physical current sensor of a bi-direction dual active bridge DC to DC converter in a controller of the converter to remove at least one physical current sensor from the converter. In certain embodiments, simulating a current sensor includes inputting an estimated output current feedback inner state signal $\hat{e}_o$ into a voltage output command feedback loop of the controller.

In certain embodiments, inputting the estimated output current feedback state signal $\hat{e}_o$ can include inputting the estimated output current feedback signal $\hat{e}_o$ into the current output command feedback loop of the controller. The simulating as described herein can include increasing the dynamic stiffness of output voltage of the converter.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
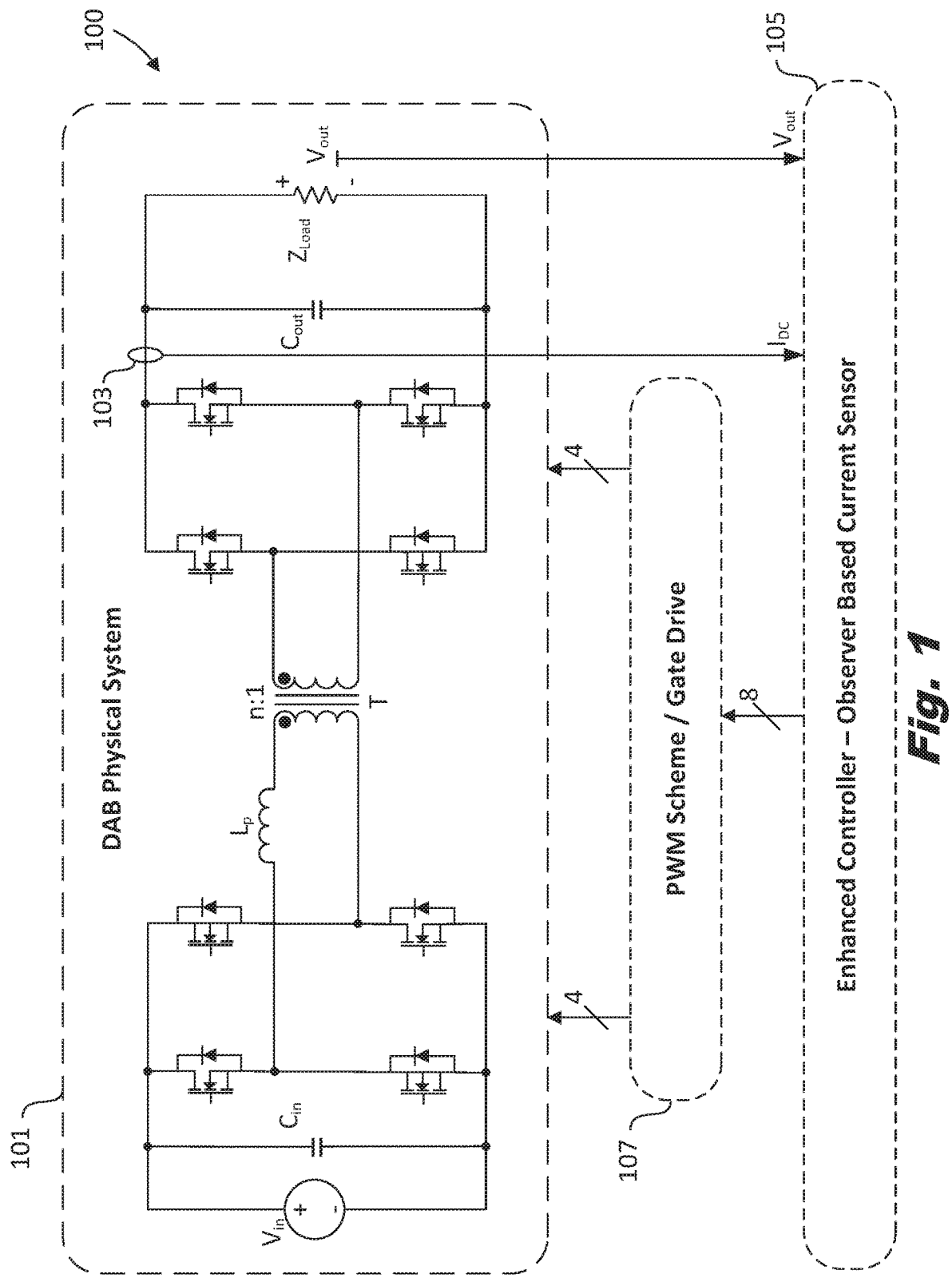
FIG. 1 is a schematic diagram of an embodiments of a converter in accordance with this disclosure.
Figure 2:
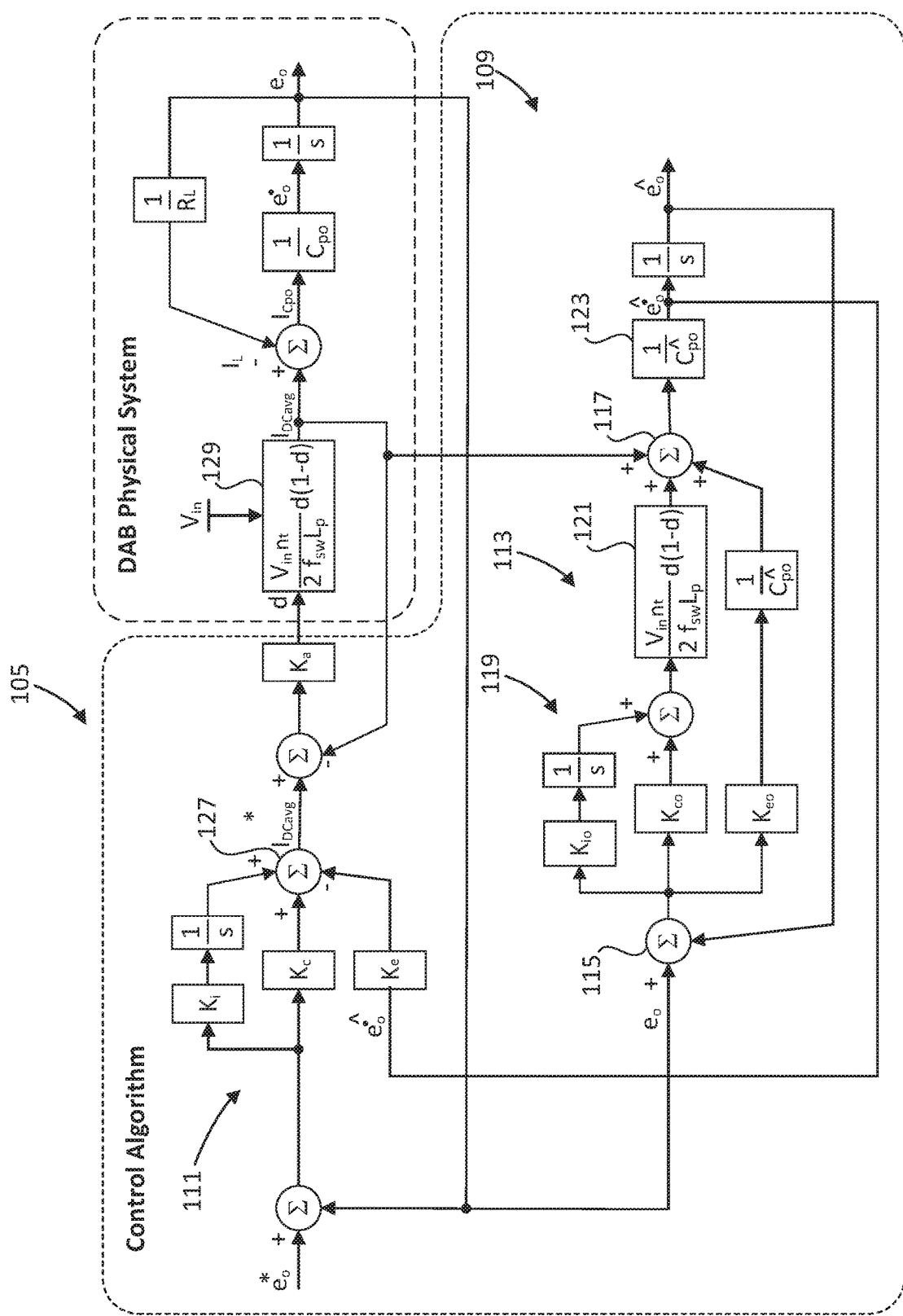
FIG. 2 is a schematic functional diagram of an embodiment of a controller in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2. The systems and methods described herein can be used to reduce physical size of a DC to DC converter and/or increase performance/signal quality of a DC to DC converter (e.g., for use in an aerospace applications or any other suitable application).

Referring to FIGS. 1 and 2, in accordance with at least one aspect of this disclosure, a bi-directional DC to DC converter 100 includes a DC to DC conversion circuit 101. The conversion circuit 101 can include any suitable electrical hardware components as appreciated by those having ordinary skill in the art. However, traditionally, an extra physical current sensor would be present to the right (in the current loop of the capacitor $C_{out}$ and the resistor $Z_L$ or $R_L$ as shown) of the shown $I_{DC}$ sensor 103, which is replaced in accordance with this disclosure.

The converter 100 also includes a controller 105 operatively connected to the conversion circuit 101 (e.g., via a pulse width modulation (PWM) scheme gate drive 107, or other suitable gate driver) to control a current output of the conversion circuit 101. The controller 105 can include any suitable hardware (e.g., one or more microprocessors) and/or software (e.g., any suitable computer code).

Referring additionally to FIG. 2, the controller 105 includes an observer based estimated current sensor module 109 which is configured to estimate a physical current sensor and to input an estimated output current feedback inner state signal $\hat{e}_o$ into a voltage output command feedback loop 111 of the controller 105. The current sensor module 109 can include an estimated sensor feedback loop 113 as shown.

In certain embodiments, the controller 105 can be configured to input an output voltage state signal $e_o$ from the controller at a beginning block 115 of the estimated sensor feedback loop 113. For example, the beginning block 115 of the estimated sensor feedback loop 113 can include an error block (that subtracts output from input) configured to subtract a first output $\hat{e}_o$ of the estimated sensor feedback loop 113 from the output current signal $e_o$ to create an estimated error signal.

The controller can be configured to input an inner loop current signal $I_{DCavg}$ into an estimated sensor sum block 117 of the estimated sensor feedback loop 113. The estimated sensor feedback loop 113 can be configured to input the estimated error signal into parallel transfer functions 119, the output of which is input into the estimated sensor sum block 117 (e.g., after being processed through a state transfer function 121) and summed with the inner loop current signal $I_{DCavg}$. The state transfer function 121 can be the same transfer function as the plant transfer function, for example.

An output of the estimated sensor sum block 117 can be input into at least one transfer function 123 to produce the estimated output current feedback inner state signal $\hat{e}_o$. In certain embodiments, the estimated output current feedback inner state signal $\hat{e}_o$ can be input into an error block 127 to subtract from an input estimated output current feedback signal $*\hat{e}_o$. For example, an output of the sum block 127 of the output command feedback loop 111 can be an input inner loop current $*I_{DCavg}$ (e.g., from which the inner loop current signal $I_{DCavg}$ can be derived after processing through one or more transfer functions 129 (e.g., the plant)).

In accordance with at least one aspect of this disclosure, the controller includes an observer based estimated current sensor module which is configured to estimate a physical current sensor and to input an estimated inner current feedback state signal $\hat{e}_o$ into the closed loop current ($I_{DCavg}$) command summing junction of the DAB controller. The current sensor module can include a closed loop on the estimated output voltage state $\hat{e}_o$. This allows the estimated state $\hat{e}_o$ to match measured state $e_o$ therefore accurately estimating the inner current state signal $\hat{e}_o$. The inner current states $\hat{e}_o$ can be accurately estimated and feed into the controller's closed loop current ($I_{DCavg}$) command summing junction to provide load disturbance rejection. The average DC link current state $I_{DCavg}$ is fed forward into the observer to eliminate delays and accurately track the load disturbances. A function of the observer provides a closed loop on the output voltage state ($e_o$) and estimates the inner current state $\hat{e}_o$ and uses the $I_{DCavg}$ of the above closed loop current as a feed forward term to track load disturbances of the DAB system. Embodiments of the overall control algorithm in the control design space, such as those shown in the Figures, can be used to correctly implement the observer based current sensor.

In accordance with at least one aspect of this disclosure, a method can include simulating a physical current sensor of a bi-direction dual active bridge DC to DC converter in a controller of the converter to remove at least one physical current sensor from the converter. In certain embodiments, estimating a current sensor includes inputting an estimated output current feedback inner state signal $\hat{e}_o$ into a current output command feedback loop of the controller.

In certain embodiments, inputting the estimated output current feedback signal $\hat{e}_o$ can include inputting the estimated output current feedback signal $\hat{e}_o$ into a gain block before inputting into the current output command feedback loop of the controller. The simulating as described herein can include increasing the dynamic stiffness of output voltage of the converter.

In accordance with embodiments of this disclosure, the physical current sensor in traditional DAB systems can be replaced with an observer based control system and can provide an overall increase in dynamic stiffness (load current vs output voltage) than a standard classical proportional plus integral controller. Embodiments include observer based DAB bi-directional isolated DC-DC converters as disclosed herein that can achieve improved quality output voltage and have reduced complexity of existing systems (e.g., size, weight). Embodiments save cost, weight, and area because the physical sensor is removed. Dynamic stiffness can be achieved without increasing voltage loop bandwidth.

As will be appreciated by those skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described above with reference to flowchart illustrations and/or block diagrams of methods, apparatus (systems) and computer program products according to embodiments of the invention. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Any suitable combination(s) of any disclosed embodiments and/or any suitable portion(s) thereof is contemplated therein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A bi-directional DC to DC converter, comprising:
a DC to DC conversion circuit; and
a controller operatively connected to the conversion circuit to control a voltage output of the conversion circuit, the controller including an observer based estimated current sensor module configured to simulate a physical current sensor by inputting an estimated output current feedback inner state signal $\hat{e}_o$ into a voltage output command feedback loop of the controller.

2. The converter of claim 1, wherein the current sensor module includes an estimated sensor feedback loop.

3. The converter of claim 2, wherein the controller is configured to input an output voltage state signal $e_o$ from the controller at a beginning block of the estimated sensor feedback loop.

4. The converter of claim 3, wherein the beginning block of the estimated sensor feedback loop includes an error block configured to subtract a first output estimated state $\hat{e}_o$ of the estimated sensor feedback loop from the output voltage signal $e_o$ to create an estimated error signal.

5. The converter of claim 4, wherein the controller is configured to input an inner loop current signal $I_{DCavg}$ into an estimated sensor sum block of the estimated sensor feedback loop.

6. The converter of claim 5, wherein the estimated sensor feedback loop is configured to input the estimated error signal into parallel transfer functions, the output of which is input into the estimated sensor sum block and summed with the inner loop current signal $I_{DCavg}$.

7. The converter of claim 6, wherein an output of the estimated sensor sum block is input into at least one transfer function to produce the estimated output current feedback inner state signal $\hat{e}_o$.

8. The converter of claim 7, wherein the estimated output current feedback inner state signal $\hat{e}_o$ is input into an gain block, the output of the gain block being input into a sum block of the output command feedback loop of the controller.

9. The converter of claim 8, wherein an output of the sum block of the output command feedback loop is an input inner loop current $*I_{DCavg}$.

10. A method comprising:
simulating a physical current sensor of a bi-direction dual active bridge DC to DC converter in a controller of the converter thereby allowing removal of at least one physical current sensor from the converter.

11. The method of claim 10, wherein the simulating a physical current sensor includes inputting an estimated output current feedback inner state signal $\hat{e}_o$ into a voltage output command feedback loop of the controller.

12. The method of claim 11, wherein inputting the estimated output current feedback inner state signal $\hat{e}_o$ includes inputting the estimated output current feedback inner state signal $\hat{e}_o$ into a gain block before inputting into the current output command feedback loop of the controller.

13. The method of claim 10, wherein the simulating includes increasing the dynamic stiffness of output voltage of the converter.

* * * * *